Dec. 21, 1965     C. BARASSI ETAL     3,224,482
REMOVABLE TREAD TIRES
Filed Feb. 4, 1964

INVENTORS
Carlo Barrassi &
Giulio Cappa

BY Stevens, Davis, Miller & Mosher

ATTORNEYS

United States Patent Office 3,224,482
Patented Dec. 21, 1965

3,224,482
REMOVABLE TREAD TIRES
Carlo Barassi and Giulio Cappa, both of Milan, Italy,
assignors to Pirelli S.p.A., Milan, Italy
Filed Feb. 4, 1964, Ser. No. 342,471
Claims priority, application Italy, Feb. 5, 1963,
2,342/63
4 Claims. (Cl. 152—176)

This invention relates to pneumatic tires for vehicle wheels, which tires are provided with an interchangeable tread. Tires of this type are fabricated in two parts. One part is a tread ring provided in proximity of its inner surface with a reinforcement to render the ring longitudinally inextensible. The other part is a carrying carcass of such a size that, when it is inflated devoid of the tread ring, its outer diameter is greater than the inner diameter of the ring. Accordingly, the ring may be securely mounted on the carrying carcass by virtue of the inflation pressure. Tires of such a construction are well known in the art.

Reinforcements of the tread ring in pneumatic tires of the type described above are always substantially cylindrical; that is, transversally flat. This is deemed necessary since the reinforcement, if provided with transverse as well as longitudinal bending, would lie on a surface which cannot be spread out on a flat surface. Consequently, if a tire having a non-cylindrical reinforcement is compressed on level ground, the reinforcement is subjected to deformations and intense inner stresses which, in the course of time, impair the reinforcement itself.

On the other hand it is known that transverse bending of the tread is very useful, since it brings about better riding comfort and improved road holding ability in pneumatic tires.

The primary purpose of the present invention is providing a removable tread tire wherein the tread is provided with transversal bending, but which does not exhibit the above described problem.

Briefly summarized, the present invention comprises a removable tread tire consisting of a carcass having on its outer periphery two or more upstanding continuous longitudinal ribs, and a tread ring having on its inner surface two or more continuous longitudinal grooves to receive the longitudinal ribs of the carcass. The tread ring is provided with a plurality of inextensible reinforcements which may be in the form of longitudinal cords, disposed in proximity of the inner surface of the ring and in the regions remote from the portions in which the longitudinal grooves are formed. The tread is further provided, in a radially outermost position relative to the inextensible reinforcements, with a plurality of strips of fabric each of a width substantially equal to that of the tread and constituted by cords disposed parallel to one another in each strip and crossed in the strips. This arrangement is characterized in that the inextensible reinforcements of the tread lie on a surface having a substantial transversal bending, and the cords of the strips form angles ranging between 20° and 60° with respect to the longitudinal direction.

The division of the reinforcing structure of the tread ring into separate groups lends a flexibility that permits the tread to readily conform to the flat surface constituted by the supporting ground. However, because the central reinforcements, due to the transversal bending, have a longitudinal development slightly different from that of the lateral reinforcements, there is a tendency for the central reinforcements to displace longitudinally with respect to the lateral reinforcements. While this tendency does not result in actual movement due to the fact the tread is constituted by a single ring, it nevertheless exerts sufficient stress on the portions disposed between the reinforcements, to cause cracks and ruptures in the tread.

Therefore, it was found necessary to provide two strips of fabric in a radially outermost position with respect to the reinforcements. It has been found that the angle formed by the cords of these strips with respect to the longitudinal direction must range between 20° and 60° and, according to a preferred alternative embodiment of the invention, should range between 25° and 40°.

The inventors have observed, quite unexpectedly, that these strips are not only capable of completely avoiding the possible damages caused by the stresses concentrated in the portions between two adjacent reinforcements, but they also have considerable influence on the riding comfort, and this independently of the improved comfort due to the transversal bending of the tread.

Moreover, according to a particularly advantageous form of realization, the transversal bending of the tread is more notable at the edges of the tread than in its central portion. This is to say that the transversal bending radius in the central portion of the tread is greater than in the lateral portions. The presence of a central portion of the tread having a considerable bending radius results in a removable tread having a greater longevity as well as good road holding properties and an improved riding comfort.

The invention will now be better understood with reference to the attached drawings in which, by way of non-limiting example;

Figure 1:
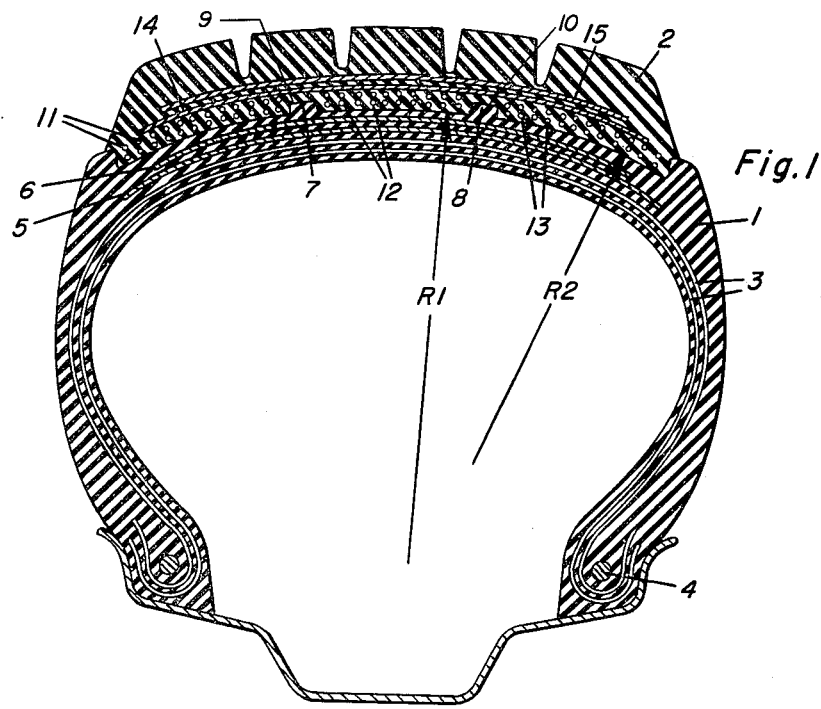
FIG. 1 is a cross sectional view of a pneumatic tire in accordance with the present invention.
Figure 2:
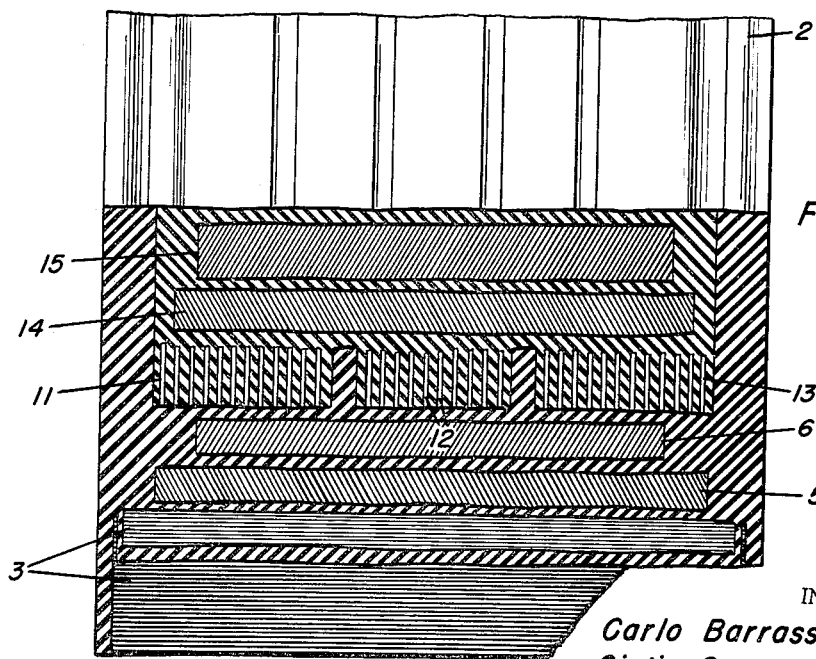
FIG. 2 is a developed plan view of the tread of the pneumatic tire shown in FIG. 1, with portions removed for illustrative purposes.

In the tire structure shown, the reference numeral 1 indicates the carcass carrying tread ring 2. The carrying carcass 1 is provided with a plurality of plies 3 the cords of which lie either in radial planes or form small angles with them. The end portions of the plies are wrapped about bead wires 4.

The carcass is provided with a breaker structure constituted by two strips 5 and 6, the cords of which form angles of 30° with respect to the longitudinal direction.

Continuous longitudinal ribs 7 and 8 are provided on the periphery of carcass 1.

The tread ring 2 is provided, on its inner surface, with continuous longitudinal grooves 9 and 10 adapted to receive longitudinal ribs 7 and 8. In proximity of the inner surface, in regions remote from the portions in which the grooves are formed, the tread ring is provided with three reinforcement groups 11, 12 and 13 each formed by two layers of longitudinal cords, and lying on a transversally bent surface. The central portion of said surface has a bending radius R1, whereas the lateral portions have bending radiuses R2, considerably smaller than R1. By way of example, the values of these radiuses for a pneumatic tire of size 165–15 can be $R1=200$ mm. and $R2=75$ mm.

Two strips of fabric 14 and 15, the cords of which cross the longitudinal direction at an angle of 30°, are disposed in a radially outermost position with respect to the reinforcement groups 11, 12 and 13.

The cords constituting the fabrics used in the pneumatic tire forming the object of the present invention can be made both of metallic material and of organic textile material, but are preferably made of organic textile material.

It will be understood that a number of variations may be made in the present invention without any departure

What is claimed is:

1. A pneumatic tire comprising a removable tread ring, a carrying carcass, a plurality of longitudinal ribs provided on the outer periphery of said carcass, said tread ring extending over said carcass and having a plurality of grooves on its inner surface which receive said ribs and which divide said tread ring into a central portion and at least two lateral portions, a group of inextensible longitudinal cords wholly confined within each of said portions of said tread ring and lying on a surface having a substantial transversal bending, and at least two strips of fabric disposed in said tread ring in a radially outermost position with respect to said cords.

2. A pneumatic tire as in claim 1, characterized in that the surface on which lie the inextensible reinforcements of the tread has in the central portion a bending radius considerably greater than that of the lateral portions.

3. The tire of claim 1 wherein said strips are of a width substantially equal to that of the tread ring and comprise a plurality of cords parallel to one another in each strip, crossed in the two strips, and forming angles ranging between 20° and 60° with respect to the longitudinal direction.

4. A pneumatic tire as in claim 3, characterized in that the cords of the strips of the tread ring form angles ranging between 25° and 40° with respect to the longitudinal direction.

References Cited by the Examiner

UNITED STATES PATENTS

| | | | |
|---|---|---|---|
| 2,782,830 | 2/1957 | Wallace | 152—361 X |
| 2,985,214 | 5/1961 | Lugli | 152—355 X |
| 3,018,810 | 1/1962 | Barassi | 152—176 |
| 3,057,392 | 10/1962 | Nallinger | 152—361 |

ARTHUR L. LA POINT, *Primary Examiner.*